United States Patent
Tanaka et al.

(10) Patent No.: US 10,597,476 B2
(45) Date of Patent: Mar. 24, 2020

(54) ANTICORROSIVE, TERMINAL-ATTACHED COVERED ELECTRIC WIRE, AND WIRING HARNESS

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Shigeyuki Tanaka, Yokkaichi (JP); Hironobu Rachi, Yokkaichi (JP); Naoyuki Oshiumi, Yokkaichi (JP); Kenji Ito, Yokkaichi (JP); Takashi Takada, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 596 days.

(21) Appl. No.: 14/760,140

(22) PCT Filed: Oct. 3, 2014

(86) PCT No.: PCT/JP2014/076520
§ 371 (c)(1),
(2) Date: Jul. 9, 2015

(87) PCT Pub. No.: WO2015/060100
PCT Pub. Date: Apr. 30, 2015

(65) Prior Publication Data
US 2015/0368389 A1    Dec. 24, 2015

(30) Foreign Application Priority Data

Oct. 25, 2013   (JP) ................................. 2013-222314
Mar. 10, 2014   (JP) ................................. 2014-046061

(51) Int. Cl.
*C08F 265/06* (2006.01)
*C09D 4/06* (2006.01)
(Continued)

(52) U.S. Cl.
CPC .............. *C08F 265/06* (2013.01); *C09D 4/06* (2013.01); *C09D 133/06* (2013.01); *H01B 1/023* (2013.01);
(Continued)

(58) Field of Classification Search
CPC ........ C08F 265/06; C09D 4/06; C09D 133/06
See application file for complete search history.

(56) References Cited

U.S. PATENT DOCUMENTS 4,927,431 A * 5/1990 Buchanan ............... B24D 3/28
427/520
5,981,113 A   11/1999 Christian
(Continued)

FOREIGN PATENT DOCUMENTS

CN    102933749 A    2/2013
GB       1550382 A *  8/1979 .............. C08F 20/18
(Continued)

OTHER PUBLICATIONS

Oct. 27, 2016 Search Report issued in European Patent Application No. 14855771.3.
(Continued)

*Primary Examiner* — Ling Siu Choi
*Assistant Examiner* — David L Miller
(74) *Attorney, Agent, or Firm* — Oliff PLC

(57) ABSTRACT

Provided is an anticorrosive containing a curable resin composition and that has a high anticorrosive capability and
(Continued)

a good adhesion to an oily surface, and a terminal-attached covered electric wire and a wiring harness using the anticorrosive. The terminal-attached covered electric wire has a contact portion where a wire conductor of a covered electric wire and a connection terminal contact each other. The contact portion is covered with the anticorrosive. The wiring harness contains the terminal-attached covered electric wire. The curable resin composition contains 100 parts by mass of a polymer of a (meth)acrylate monomer, the polymer having two or more (meth)acrylate groups, 40 to 90 parts by mass of isobornyl (meth)acrylate, and 1 to 15 part by mass of an alkyl (meth)acrylate represented by formula 1, where R1 is either H or CH3, and R2 is an alkyl group having a carbon number of 8 to 13,

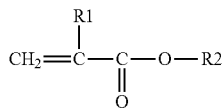
(1)

11 Claims, 2 Drawing Sheets

(51) Int. Cl.
| | |
|---|---|
| H02G 15/04 | (2006.01) |
| C09D 133/06 | (2006.01) |
| H01B 1/02 | (2006.01) |
| H01B 7/00 | (2006.01) |
| H01B 7/28 | (2006.01) |
| H01R 4/02 | (2006.01) |
| H01R 43/02 | (2006.01) |
| H01R 4/62 | (2006.01) |
| C08F 220/18 | (2006.01) |
| H01R 4/18 | (2006.01) |
| H02G 1/14 | (2006.01) |
| H01R 13/52 | (2006.01) |

(52) U.S. Cl.
CPC ............ *H01B 1/026* (2013.01); *H01B 7/0045* (2013.01); *H01B 7/2806* (2013.01); *H01R 4/029* (2013.01); *H01R 43/0207* (2013.01); *H01R 43/0214* (2013.01); *H02G 15/04* (2013.01); *C08F 220/18* (2013.01); *H01R 4/185* (2013.01); *H01R 4/62* (2013.01); *H01R 13/5216* (2013.01); *H02G 1/14* (2013.01)

(56) References Cited

U.S. PATENT DOCUMENTS

| | | | |
|---|---|---|---|
| 6,232,359 | B1 | 5/2001 | Christian |
| 6,632,481 | B1 * | 10/2003 | Blum ................... C08G 18/683 |
| | | | 427/385.5 |
| 2012/0205151 | A1 | 8/2012 | Inoue et al. |
| 2012/0325552 | A1 | 12/2012 | Sakura |
| 2013/0056266 | A1 | 3/2013 | Inoue et al. |
| 2013/0062114 | A1 | 3/2013 | Inoue et al. |
| 2013/0252459 | A1 | 9/2013 | Tanaka et al. |

FOREIGN PATENT DOCUMENTS

| | | | |
|---|---|---|---|
| JP | H05-159846 A | 6/1993 | |
| JP | WO 9910443 A1 * | 3/1999 | ......... C03C 25/1065 |
| JP | 2001-506303 A | 5/2001 | |
| JP | 2003-055582 A | 2/2003 | |
| JP | 2011-111632 A | 6/2011 | |
| JP | 2011-256429 A | 12/2011 | |

OTHER PUBLICATIONS

Dec. 22, 2014 International Search Report issued in International Patent Application No. PCT/JP2014/076520.
Dec. 1, 2016 Office Action issued in Chinese Patent Application No. 201480017409.2.

* cited by examiner

ANTICORROSIVE, TERMINAL-ATTACHED COVERED ELECTRIC WIRE, AND WIRING HARNESS

TECHNICAL FIELD

The present invention relates to an anticorrosive, a terminal-attached covered electric wire, and a wiring harness, and more specifically relates to an anticorrosive that is excellently used to prevent corrosion at an electrically connected portion where a wire conductor and a connection terminal are in contact with each other, and relates to a terminal-attached covered electric wire and a wiring harness using the anticorrosive.

BACKGROUND ART

Conventionally, a covered electric wire, which has a wire conductor made of a metal material such an annealed tough pitch copper and an insulation that covers the wire conductor, is in widespread use as an electric wire for wiring in a car such as an automobile. A connection terminal is connected to the wire conductor that is exposed by removal of the insulation, at an end of the covered electric wire. The connection terminal, electrically connected to the end of the covered electric wire, is inserted into a connector and locked therein.

A plurality of the covered electric wires with the connection terminals is bunched into a wiring harness. The covered electric wires in the form of a wiring harness are used for wiring in a car such as an automobile. Used for wiring in an engine room or a certain indoor environment, the wiring harness is susceptible to heat and water, which results in formation of rust at electrically connected portions where the wire conductors and the connection terminals are in contact with each other. For this reason, it is necessary to prevent corrosion at the electrically connected portions when the wiring harness is used in such an environment.

In order to prevent corrosion at the electrically connected portions, PTL 1, for example, discloses charging grease in the connectors in which the connection terminals connected to the wire conductors are inserted and locked.

These days, there are increasing efforts to improve fuel efficiency by weight reduction of a car such as an automobile, and accordingly weight reduction of materials for the electric wires that make up the wiring harness is demanded. For this reason, using aluminum for the wire conductors is considered. Copper or a copper alloy, which has excellent electric properties, is generally used for the connection terminals, and accordingly the aluminum electric wires and the copper terminals are often used in combination. When the wire conductors are different in material from the connection terminals, bimetallic corrosion occurs at the electrically connected portions between them. This kind of corrosion occurs more easily compared with the case of using a same material for the wire conductors and the connection terminals. For this reason, an anticorrosive is required which can prevent corrosion at the electrically connected portions in a reliable way.

The conventional grease can not sufficiently prevent entrance of water and resulting corrosion if the connectors are not filled densely with the grease. If the amount of the grease is increased in order to enhance the anticorrosion effect, the grease may unintentionally coat a portion where prevention of corrosion is not needed. In addition, an excessive amount of the grease makes the connectors and the electric wires sticky, which decreases handleability thereof.

Thus, an anticorrosive that highly prevents the corrosion, as a replacement for the grease, and a terminal-attached covered electric wire using the anticorrosive have been proposed (see PTL2, for example). The anticorrosive and the wire disclosed in PTL2 overcome the above-described disadvantages of use of the grease.

CITATION LIST

Patent Literature

PTL1: JP Hei05-159846 A
PTL2: JP 2011-111632 A

SUMMARY OF INVENTION

Technical Problem

Machining oil that is used on production of a connection terminal is usually left on a surface of the connection terminal. The machining oil inhibits adhesion of an anticorrosive to the connection terminal. For this reason, an anticorrosive that has a good adhesion to an oily surface is demanded.

The present invention has been made in view of the problems described above, and an object of the present invention is to provide an anticorrosive that has a high anticorrosive capability and a good adhesion to an oily surface. Other objects of the present invention are to provide a terminal-attached covered electric wire using the anticorrosive, and to provide a wiring harness using the anticorrosive.

Solution to Problem

To achieve the objects and in accordance with the purpose of the present invention, an anticorrosive according to a preferred embodiment of the present invention is an anticorrosive adapted to cover a contact portion of a terminal-attached covered electric wire where a wire conductor of a covered electric wire and a connection terminal is in contact with each other. The anticorrosive contains a curable resin composition that contains, as main ingredients, (A) 100 parts by mass of a polymer of a (meth)acrylate monomer, the polymer having two or more (meth)acrylate groups, (B) 40 to 90 parts by mass of isobornyl (meth)acrylate, and (C) 1 to 15 part by mass of an alkyl (meth)acrylate represented by formula 1, where R1 is either H or CH$_3$, and R2 is an alkyl group having a carbon number of 8 to 13,

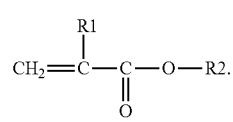

(1)

The composition in the anticorrosive preferably further contains (D) 10 to 40 parts by mass of an alkyl (meth) acrylate represented by formula 1, where R1 is either H or CH$_3$, and R2 is an alkyl or alkylether group having a carbon number of 2 to 4, with respect to 100 parts by mass of the ingredient (A).

The composition in the anticorrosive may be an ultraviolet curable resin composition.

The composition in the anticorrosive preferably contains a photoinitiator having an absorption in a wavelength range of 320 to 420 nm.

The composition in the anticorrosive may be a thermally curable resin composition.

In another aspect of the present invention, a terminal-attached covered electric wire according to a preferred embodiment of the present invention contains a wire conductor and a connection terminal. The terminal-attached covered electric wire contains a contact portion where the wire conductor and the connection terminal are in contact with each other. The contact portion is covered with the anticorrosive according to the preferred embodiment of the present invention.

It is preferable that the wire conductor is made of an aluminum-based metal, the connection terminal is made of a copper-based metal, and the contact portion forms a bimetallic connection.

Yet, in another aspect of the present invention, a wiring harness according to a preferred embodiment of the present invention contains the terminal-attached covered electric wire according the preferred embodiment of the present invention.

Advantageous Effects of Invention

The anticorrosive according to the preferred embodiment of the present invention is the anticorrosive adapted to cover the contact portion of the terminal-attached covered electric wire where the wire conductor of the covered electric wire and the connection terminal is in contact with each other. The anticorrosive contains the curable resin composition that contains as the main ingredients, (A) 100 parts by mass of the polymer of the (meth)acrylate monomer, the polymer having two or more (meth)acrylate groups, (B) 40 to 90 parts by mass of isobornyl (meth)acrylate, and (C) 1 to 15 part by mass of the alkyl (meth)acrylate represented by formula 1, where R1 is either H or $CH_3$, and R2 is the alkyl group having the carbon number of 8 to 13. Containing the curable resin composition, the anticorrosive has a high anticorrosive capability and a good adhesion to an oily surface.

Further, the anticorrosive has both a good adhesion and a high heat resistance since the curable resin composition contains the ingredients described above. Specifically, containing the specific amount of isobornyl (meth)acrylate (B), the anticorrosive has a high heat resistance, and thus undergoes little deterioration at a high temperature. Accordingly, the elongation of the anticorrosive is hard to be decreased at a high temperature, and cracks are hardly formed in the anticorrosive during cooling/heating cycles.

Further, the anticorrosive has a high compatibility with a surface of the connection terminal on which a machining oil is left since the curable resin composition contains the specific amount of the alkyl (meth)acrylate (C). Thus, the anticorrosive has a good adhesion to the oily surface as well as a sufficient adhesion to a metal surface free from the machining oil. In addition, the specific carbon number of the alkyl group in the alkyl (meth)acrylate (C) increases the adhesion of the anticorrosive to the oily surface and a heat aging resistance thereof, which can be evaluated through a low-temperature tensile test after heat aging.

The terminal-attached covered electric wire according to the preferred embodiment of the present invention contains the wire conductor and the connection terminal. The terminal-attached covered electric wire contains the contact portion where the wire conductor and the connection terminal are in contact with each other, and the contact portion is covered with the anticorrosive. Thus, corrosion is excellently prevented in the contact portion. An especially excellent anticorrosion effect is achieved, when the wire conductor is made of the aluminum-based metal, the connection terminal is made of the copper-based metal, and the contact portion forms the bimetallic connection.

In the wiring harness according to the preferred embodiment of the present invention, corrosion is excellently prevented in the contact portion between the covered electric wire and the connection terminal.

DESCRIPTION OF EMBODIMENTS

Figure 1:
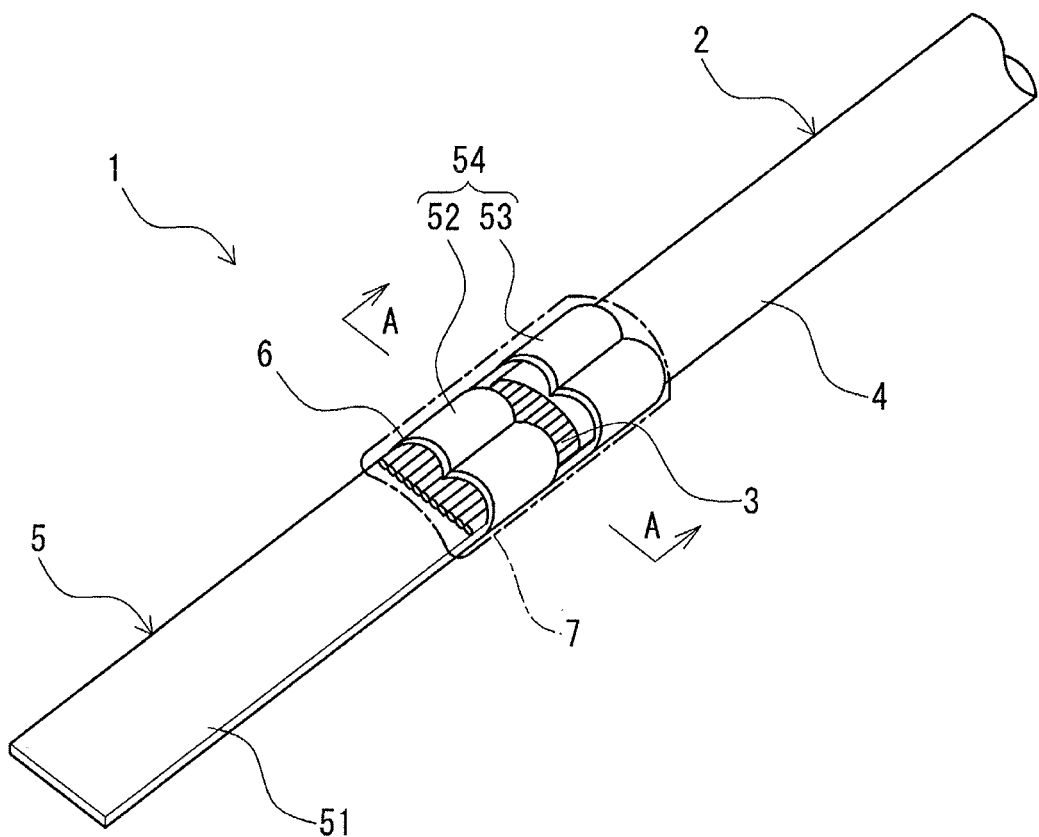
FIG. 1 is an external perspective view showing a terminal-attached covered electric wire according to a preferred embodiment of the present invention.
Figure 2:
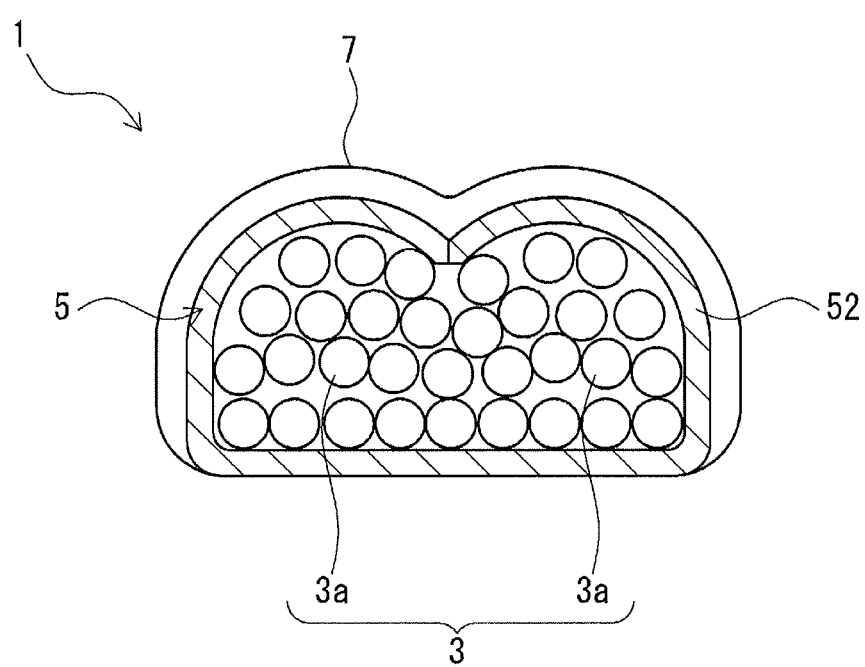
FIG. 2 is a cross-sectional view showing the same along the line A-A in FIG. 1.

A detailed description of a preferred embodiment of the present invention will now be provided with reference to the figures. FIG. 1 is an external perspective view showing a terminal-attached covered electric wire according to a preferred embodiment of the present invention. FIG. 2 is a cross-sectional view showing the same along the line A-A in FIG. 1. As shown in FIGS. 1 and 2, a terminal-attached covered electric wire 1 according to a preferred embodiment of the present invention has a covered electric wire 2 and a connection terminal 5 made of brass. An end portion of the connection terminal 5 is crimped onto an end portion of the wire 2. The covered electric wire 2 has a wire conductor 3 made of an aluminum alloy and an insulation 4 made of a polyvinyl chloride resin. The insulation 4 covers the wire conductor 3. The crimped portion between the wire conductor 3 and the connection terminal 5 serves as a contact portion 6, and the wire conductor 3 and the connection terminal 5 are electrically connected to each other at the contact portion 6. The contact portion 6 is covered with an anticorrosive 7. In FIG. 1, a film of the anticorrosive 7 is shown transparently.

One of characteristic features of the anticorrosive 7 according to the preferred embodiment of the present invention lies in that the anticorrosive 7 contains a curable resin composition that contains ingredients (A) to (C) shown below, as main ingredients. A description of the curable resin composition contained in the anticorrosive 7 is presented below.

The ingredients are as follows:

(A) 100 parts by mass of a polymer of a (meth)acrylate monomer, the polymer having two or more (meth)acrylate groups, (B) 40 to 90 parts by mass of isobornyl (meth)acrylate, and (C) 1 to 15 parts by mass of an alkyl (meth)acrylate represented by formula 1, where R1 is either H or $CH_3$, and R2 is an alkyl group having a carbon number of 8 to 13 (i.e., C18-C13 alkyl group),

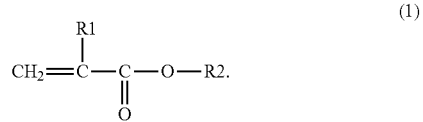

(1)

(A) Polymer of (Meth)Acrylate Monomer:

The ingredient (A) has a main skeleton of a polymer of a (meth)acrylate monomer. Examples of the ingredient (A) is an acrylate oligomer that has a skeltone in which a (meth)acrylate monomer having one (meth)acrylate group is polymerized and has two or more (meth)acrylate groups.

A monofunctional (meth)acrylate monomer, which has one (meth)acrylate group, may be used without any specific limitation. Examples of the monomer include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, trifluoromethylmethyl (meth)acrylate, 2-perfluoroethyl(meth)acrylate, 2-perfluoromethyl (meth)acrylate, 2-(perfluorohexyl)ethyl (meth)acrylate, and 2-(perfluorodecyl)ethyl (meth)acrylate. They may be used singly or in combination.

It is preferable that the ingredient (A) is a polymer of the monofunctional (meth)acrylate monomer. The polymerization degree of the polymer of the (meth)acrylate monomer is preferably within a range of 5 to 500.

The term "(meth)acrylate" refers to a methacrylate and an acrylate in the present invention.

(B) Isobornyl (Meth)Acrylate:

The ingredient (B) is a monomer of isobornyl (meth)acrylate. Containing 40 to 90 parts by mass of the ingredient (B) with respect to 100 parts by mass of the ingredient (A), the anticorrosive has both a good adhesion and a high heat resistance. If the content of isobornyl (meth)acrylate is lower than 40 parts by mass, the anticorrosive could have a low heat resistance, and the elongation of the anticorrosive could be decreased due to a high-temperature degradation, whereby the anticorrosive could not have properties suitable for practical use. On the other hand, if the content is higher than 90 parts by mass, the anticorrosive could be too hard to have a sufficient flexibility, and thus cracks are easily formed in the anticorrosive in a durability test during cooling/heating cycles.

(C) Alkyl (Meth)Acrylate (of C8 to C13):

The ingredient (C) is a C8-C13 alkyl (meth)acrylate monomer. Containing 1 to 15 parts by mass of the ingredient (C) with respect to 100 parts by mass of the ingredient (A), the anticorrosive has a good adhesion to the connection terminal. If the content of the ingredient (C) is lower than 1 part by mass, the anticorrosive could not have sufficient compatibility with the machining oil, and thus could not achieve a sufficient adhesion to the oily surface. On the other hand, if the content is higher than 15 parts by mass, the anticorrosive could be too hydrophobic to have a sufficient adhesion to the metal surface of the connection terminal.

If the alkyl group of the alkyl (meth)acrylate (C) is smaller than C8, the alkyl (meth)acrylate (C) could not have sufficient compatibility with the machining oil, and thus the anticorrosive could not have a sufficient adhesion to the oily surface. On the other hand, if the alkyl group is larger than C13, the glass transition temperature of the monomer of the alkyl (meth)acrylate could be too high. Thus, the anticorrosive could be too hard at a low temperature to have a sufficient heat aging resistance, which is measured through a low-temperature tensile test after heat aging.

Specific examples of the alkyl (meth)acrylate monomer (C) include isooctyl acrylate (C8), 2-ethylhexyl methacrylate (C8), isononyl acrylate (C9), lauryl acrylate (C12), lauryl methacrylate (C12), tridecyl acrylate (C13), and tridecyl methacrylate (C13). They may be used singly or in combination. It is preferable that the (meth)acrylate monomer has an alkyl group of C10 or larger in view of adhesion of the anticorrosive to the oily surface.

(D) Alkyl (Meth)Acrylate (of C2 to C4):

It is preferable that the curable resin composition in the anticorrosive according to the preferable embodiment of the present invention further contains 10 to 40 parts by mass of (D) an alkyl (meth)acrylate represented by formula 1, where R1 is either H or $CH_3$, and R2 is an alkyl or alkylether group having a carbon number of 2 to 4, with respect to 100 parts by mass of the ingredient (A). When the curable resin composition containing the ingredient (D), a cured product of the composition has a lowered glass transition temperature and an improved cold/heat shock resistance. When the content of the ingredient (D) is lower than 10 parts by mass with respect to 100 parts by mass of the ingredient (A), the cured product of the composition may have insufficiently low-temperature properties. On the other hand, when the content is higher than 40 parts by mass, the cured product of the composition may have a low heat aging resistance and/or a low hardness.

Examples of the C2-C4 alkyl (meth)acrylate (D) include ethyl (meth)acrylate, butyl (meth)acrylate, and methoxyethyl (meth)acrylate.

(E) Polymerization Initiator:

The curable resin composition may contain (E) a polymerization initiator. The content of the polymerization initiator is preferably within a range of 0.1 to 10 mass % with respect to the total mass of the anticorrosive composition. Specific examples of the polymerization initiator include a photopolymerization initiator and a thermal polymerization initiator.

The curable resin composition in the anticorrosive is preferably an ultraviolet curable resin composition, which can be cured with ultraviolet irradiation, in view of reducing a curing time. When the composition is ultraviolet curable, the composition preferably contains, as the polymerization initiator, an ultraviolet polymerization initiator (also referred to as a photopolymerization initiator or a photoinitiator). The photoinitiator is preferably a compound having an absorption in a wavelength range of 320 to 420 nm. Containing the compound as the photoinitiator, the anticorrosive can be cured with the use of an ultraviolet irradiation equipment having an LED light source.

Any compound that absorbs ultraviolet light and initiates radical polymerization may be used as the photoinitiator. A conventionally known photoinitiator may be used. Specific examples of the photoinitiator include 1-hydroxycyclohexyl phenyl ketone, 2,2-dimethoxy-2-phenylacetophenone, xanthone, fluorenone, benzaldehyde, fluorene, anthraquinone, ethylanthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethyl benzoyl diphenyl phosphine oxide, and bis-(2,6-dimethoxy benzoyl)-2,4,4-trimethylpentyl phosphine oxide. They may be used singly or in combination.

Alternatively, the curable resin composition may be a thermally curable resin composition. When the composition is thermally curable, the composition preferably, contains a thermal polymerization initiator as the polymerization initiator.

Any compound that generates radicals upon heated and initiates radical polymerization may be used as the thermal polymerization initiator.

Conventionally known organic peroxide and azo compound may be used. Examples of the organic peroxide include a dialkyl peroxide such as dihexyl peroxide, dicumyl peroxide, t-butyl cumyl peroxide, and 2,5-dimethyl-2,5-bis(t-butylperoxy)hexane, and a peroxyketal such as n-butyl-4,4-di(t-butylperoxide)valerate. Examples of the azo compound include azobisisobutyronitrile.

The curable resin composition may further contain other ingredients in addition to the ingredients (A) to (D) and the photoinitiator (E) as necessary within a range of not impairing the object of the present invention. Examples of the other ingredients include an antiaging agent, an adhesion imparting agent, a corrosion inhibitor, a thixotropy imparting agent, an agent for modifying a liquid property such as a levelling agent, a pigment, a dye, and an inorganic filler.

Then, a description of the terminal-attached covered electric wire according to the preferable embodiment of the present invention is presented below. As shown in FIGS. 1 and 2, the terminal-attached covered electric wire 1 has the contact portion 6 where the aluminum alloy of the wire conductor 3 and the tin plated brass of the connection terminal 5 are in contact with each other. Thus, the contact portion 6 serves as a bimetallic connection where the two different kinds of metals, i.e., the aluminum-based metal and the copper-based metal, are in contact with each other.

The connection terminal 5 is made of a metal plate that has a brass base material and a tin plated layer on the surface of the base material. The metal plate is punched into an expanded shape of the connection terminal 5, and then certain portions of the plate such as barrels are bent. The connection terminal 5 has a tab-shaped connecting portion 51 that works as a male terminal to be connected to a counterpart female terminal, and a barrel portion 54 that is extended from a base end of the connecting portion 51 to be crimped on the covered electric wire. The barrel portion 54 has two crimping portions: a wire barrel 52 formed on a side where the connecting portion 51 is located, and an insulation barrel 53 formed on a side where the covered electric wire 2 is located.

In the terminal-attached covered electric wire 1, the wire barrel 52 of the connection terminal 5 is crimped onto an end portion of the wire conductor 3 that is exposed by removal of the insulation 4. The insulation barrel 53 of the connection terminal 5 is crimped around the insulation 4 of the covered electric wire 2. The crimped portion of the insulation barrel 53 works as a wire fixing portion to hold and fix the connection terminal 5 at the end portion of the covered electric wire 2.

In the terminal-attached covered electric wire 1, the anticorrosive 7 containing the curable resin composition is applied on the contact portion 6 where the wire conductor 3 of the covered electric wire 2 and the connection terminal 5 are in contact with each other, and a cured product of the anticorrosive 7 covers the contact portion 6. The anticorrosive 7 covers at least an exposed portion of the wire conductor 3 in the contact portion 6 and the contact interface between the wire conductor 3 and the connection terminal 5. The anticorrosive 7 works as a protection film to prevent entrance of moisture from outside into the bimetallic contact portion 6 between the wire conductor 3 and the connection terminal 5 and resulting corrosion of the metal parts.

In FIGS. 1 and 2, the portion of the terminal-attached covered electric wire 1 that is covered with the anticorrosive 7 is indicated by a chain line. As shown in FIG. 2, the anticorrosive 7 covers the portion along the outer profiles of the connection terminal 5 and the covered electric wire 2 in a certain thickness. The bottom surface of the connection terminal 5 is not covered with the anticorrosive 7, and the metal material of the connection terminal 5 is exposed on the bottom surface.

At least the exposed portion of the wire conductor 3 is entirely covered with the anticorrosive 7, and is not exposed outside. In the end portion of the covered electric wire 4, the anticorrosive 7 covers an area extending beyond the front end of the wire conductor 3 toward the connecting portion 51 of the connection terminal 5. On the other hand, in the end portion of the connection terminal 5, the anticorrosive 7 covers an area extending beyond the edge of the connection terminal 5 toward the insulator 4. The bottom surface of the connection terminal 5 shown in FIG. 2 is not covered with the film of the anticorrosive 7, and the metal material is exposed on the bottom surface.

In the terminal-attached covered electric wire 1 according to the preferred embodiment of the present invention, the area covered with the anticorrosive 7 is not limited to the specific embodiment described above as long as the wire conductor 3 is covered with the anticorrosive 7 without exposed outside. Further, it is preferable that the area where the wire conductor 3 and the connection terminal 5 are in contact with each other is covered with the anticorrosive 7. The anticorrosive 7 may cover an area extending outside the barrel portion 54 as shown in FIG. 1, and may cover the bottom surface of the connection terminal 5 though not specifically shown in figures. The side surfaces of the connection terminal 5 may be covered with the anticorrosive 7, or may be left uncovered.

As shown in FIG. 2, the wire conductor 3 is a strand made up of a plurality of elemental wires 3a. The strand may be made up of metal elemental wires of one kind, or may be made up of metal elemental wires of more than one kind. The strand may include an elemental wire made of an organic fiber in addition to the metal elemental wires. Here, the strand made up of the metal elemental wires of one kind defines a strand made up of metal elemental wires that are all made of a same metal material, and the strand made up of the metal elemental wires of more than one kind defines a strand made up of metal elemental wires that are made of metal materials different from each other. The strand may include also a reinforcement wire (tension member) for reinforcing the covered electric wire.

The metal elemental wires making up the wire conductor 3 may be made of copper, a copper alloy, aluminum, or materials that are produced by furnishing these materials with plating of various kinds, as well as the aluminum alloy. An elemental metal wire as the reinforcement wire may be made of a copper alloy, titanium, tungsten, or a stainless steel. An organic fiber as the reinforcement wire may be made of KEVLAR (trade name of DU PONT). The metal elemental wires made of aluminum or the aluminum alloy are preferably used to form the wire conductor 3 in view of weight reduction of the electric wire.

The material of the insulation 4 of the covered electric wire 2 is not specifically limited. Examples of the material include a rubber, a polyolefin, a polyvinyl chloride (PVC), and a thermoplastic elastomer. They may be used singly or in combination. The insulation 4 may contain a variety of additives such as a flame retardant, a filler, and a coloring agent, as appropriate.

The connection terminal 5 (a base material thereof) may be made of copper or a variety of copper alloys including brass. The base material may be plated with various metals such as tin, nickel, and gold on a part of the surface of the connection terminal 5 (e.g., on a surface of an electric contact point), or on an entire surface of the connection terminal 5.

The anticorrosive 7 is applied preferably to have a thickness of 0.01 to 3 mm. When the thickness is too large, it is difficult for the connection terminal 5 to be inserted into a connector having a counterpart terminal. On the other hand, when the thickness is too small, the anticorrosion effect of the anticorrosive 7 may be insufficient.

A method for producing the terminal-attached covered electric wire is described below. For producing the terminal-attached covered electric wire 1, first, a predetermined length of the wire conductor 3 is exposed at the end portion of the covered electric wire 2 by removal of the insulation 4. Then, the wire conductor 3 and the connection terminal 5 are connected to each other by crimping of the connection terminal 5 onto the end portion of the covered electric wire 2. The connection terminal 5 is made in advance by punching and bending of the plated base material. Upon the crimping of the connection terminal 5, the wire barrel 52 is crimped onto the wire conductor 3 while the insulation barrel 53 is crimped onto the insulation 4. Lastly, the anticorrosive 7 is applied on a predetermined area in the contact portion 6 between the wire conductor 3 and the connection terminal 5, and the anticorrosive 7 is cured under predetermined conditions. Thus, the terminal-attached covered electric wire 1 is produced.

The method for applying the anticorrosive 7 containing the curable resin composition onto the contact portion 6 is not specifically limited. Conventional methods such as dropping, painting, and extrusion may be used. On the application of the anticorrosive 7, the temperature of the anticorrosive 7 may be controlled by heating or cooling.

The anticorrosive 7 containing the curable resin composition may be cured with the use of a curing equipment such as an ultraviolet irradiation equipment and a heating equipment.

Lastly, a description of the wiring harness according to the preferable embodiment of the present invention is presented below. A plurality of covered electric wires including the terminal-attached covered electric wires 1 described above is bunched to form the wiring harness according to the preferred embodiment of the present invention. In the wiring harness, a part or all of the included covered electric wires may be the terminal-attached electric wires 1 according to the preferred embodiment of the present invention.

In the wiring harness, the plurality of the covered electric wires may be bound with a tape, or may be armored with an armoring member such as a circular tube, a corrugated tube, and a protector.

The wiring harness is favorably used for wiring in a car such as an automobile, especially for wiring in an engine room or the interior of a car that is subject to water. These sites are susceptible to heat and water, so that when a wiring harness is used for wiring in these sites, rust is easily formed at an electrically connected portion between a wire conductor and a connection terminal. However, in the wiring harness according to the preferred embodiment of the present invention, formation of rust is effectively inhibited since the contact portion 6 between the wire conductor 3 and the connection terminal 5 is covered with the anticorrosive 7.

EXAMPLE

A description of the present invention will now be specifically provided with reference to Examples and Comparative Examples. It is to be noted that the present invention is not limited to Examples.

Examples 1 to 7

Curable resin compositions as anticorrosives according to Examples 1 to 7 were prepared by uniform mixing of ingredients such as (meth)acrylate polymers, monomers, a photoinitiator, and a thermal initiator according to the content ratios shown in Table 1. Shear adhesion strengths, hardnesses, heat aging resistances, cold/heat shock resistances of the prepared compositions were tested. The results of the tests are shown in Table 1.

Comparative Examples 1 to 8

For comparison, curable resin compositions as anticorrosives according to Comparative Examples 1 to 8 were prepared according to the content ratios shown in Table 2, in the same way as the compositions according to Examples 1 to 7. Shear adhesion strengths, hardnesses, heat aging resistances, cold/heat shock resistances of the prepared compositions were tested in the same way as in Examples. The results of the tests are shown in Table 2. Specific ingredients used for preparation of the curable resin compositions as the anticorrosives and methods of the tests are provided below.

[Polymer of (Meth)Acrylate Monomer]
Polymer 1 (CN 820): a (meth)acrylate oligomer manufactured by SARTOMER, trade name: "CN 820"
Polymer 2 (EBECRYL 767): a straight-chain acryl oligomer manufactured by DAICEL-SCITECH, trade name: "EBECRYL 767". The oligomer is in the form of a mixture with isobornyl acrylate in a mixing ratio (mass ratio) of oligomer:IBA=70:30.

[Monomer]
Isobornyl acrylate: manuf.; SARTOMER, trade name: "SR 506"
Lauryl acrylate (C=12): manuf.; SARTOMER, trade name: "SR 335"
Tridecyl acrylate (C=13): manuf.; SARTOMER, trade name: "SR 489"
Stearyl acrylate (C=18): manuf.; SARTOMER, trade name: "SR 257"
Butyl acrylate: manuf.: MITSUBISHI CHEMICAL CORPORATION
Ethyl acrylate: manuf.: MITSUBISHI CHEMICAL CORPORATION
Methoxyethyl acrylate: manuf.: OSAKA ORGANIC CHEMICAL INDUSTRY, trade name: "2-MTA"

[Photoinitiator]
Irgacure 184: 1-hydroxy-cyclohexyl-phenyl ketone, manuf. BASF, trade name: "Irgacure 184"

[Thermal Initiator]
Perbutyl O: t-butyl-peroxy-2-ethylhexanoate, manuf.: NOF CORPORATION, trade name: "Perbutyl O"

[Adhesion Test]
A shear adhesion test in accordance with JIS K6850 was performed for the anticorrosives according to Examples 1 to 7 and Comparative Examples 1 to 8. A tin plated substrate was used as an adherend. A ring having an inner diameter of 6 mm and a height of 2 mm was placed on the tin plated substrate. Then, the anticorrosives were each charged into the space inside the ring, and were cured under the conditions described below. Thus, test samples with anticorrosive layers having a thickness of 2 mm were prepared. The test samples were prepared on both clean and oily surfaces of the tin plated substrate. The clean surface was prepared by rinsing of the surface of the substrate with ethanol. The oily surface was prepared by application of a mineral machining oil on the surface of the substrate at a density of 1 mg/cm$^2$.

For preparation of the test samples according to Examples 1-5 and 7 and Comparative Examples 1 to 8, the anticorrosives were ultraviolet-cured by irradiation of 1 J/cm$^2$ of ultraviolet light in the air. A mercury-xenon lamp having a light amount of 500 mW/cm$^2$ and a main wavelength of 365 nm was used for the ultraviolet irradiation. For preparation of the test sample according to Example 6, the anticorrosive was thermally cured by heating at 120° C. for one hour.

[Adhesion to Clean Surface]

Adhesions of the anticorrosives to the clean surface were measure through a tensile test. In the tensile test, the ring of the each test samples was pulled parallel to the tin plated substrate (at a tensile speed of 100 m/min). The anticorrosives having adhesion strengths of 1 MPa or higher were regarded as good while the anticorrosives having adhesion strengths of lower than 1 MPa were regarded as bad.

[Adhesion to Oily Surface]

For testing the adhesions of the anticorrosives to the oily surface, a tensile test was performed in the same way as the tensile test on to the clean surface. After the tensile test, failure modes of the anticorrosives after the tensile test were examined by visual observation. When cohesive failure was observed in an entire region of an anticorrosive, the anticorrosive was regarded as excellent. When cohesive failure was observed partially in an anticorrosive, the anticorrosive was regarded as good. When interface failure was observed between an anticorrosive and the tin plated substrate, the anticorrosive was regarded as bad.

[Hardness]

The hardnesses of the anticorrosives were measured with the use of a type A durometer in accordance with JIS K6253. The anticorrosives having hardnesses of 50 or lower were regarded as good while the anticorrosives having hardnesses higher than 50 were regarded as bad.

[Heat Aging Resistance]

Test samples were left at a high temperature of 120° C. for 120 hours. Then, breaking elongations of the samples were measured through a tensile test in accordance with JIS K6249 in a test atmosphere at 0° C. For preparation of the samples for the tensile test, 2-mm thick cured sheets were formed by curing of the anticorrosives through ultraviolet irradiation. Then, the sheets were punched into the shape of JIS No. 4 dumbbells. The ultraviolet irradiation for the curing was performed under the same conditions as in the preparation of the test samples for the shear adhesion test (i.e., light source: mercury-xenon lamp, light amount: 500 mW/cm$^2$, wavelength: 365 nm). The anticorrosives having elongations of 10% or higher according to the results of the tensile test were regarded as good while anticorrosives having elongations of lower than 10% were regarded as bad.

[Cold/Heat Shock Resistance]

For preparation of test samples, the product shown in FIG. 1 is covered with each of the anticorrosives in the area indicated by the chain line in the figure. Then, the anticorrosive was UV-cured or thermally cured under the same conditions as in the preparation of the test samples for the adhesion test. The prepared test samples were subjected to 500 cooling/heating cycles. In each cycle, the test samples were left in an atmosphere at −40° C. for one hour, and subsequently in an atmosphere at 120° C. for one hour. Formation of cracks on the surfaces of the test samples was examined by visual observation. The anticorrosives on which cracks were observed in 250 cycles were regarded as bad. The anticorrosives on which cracks were not observed in 250 cycles were regarded as good. The anticorrosives on which cracks were not observed in 500 cycles were regarded as excellent.

[Test Results of Examples 1 to 7 and Comparative Examples 1 to 8]

As shown in Table 1, the anticorrosives according to Examples 1 to 7 have excellent shear adhesion strengths, hardnesses, and heat aging resistances. Meanwhile, as shown in Table 2, the anticorrosives according to Comparative Examples 1 to 8 do not have sufficient shear adhesion strengths, hardnesses, and heat aging resistances all together. The anticorrosive according to Comparative Example 1 has a high hardness since the content of the lauryl acrylate in the anticorrosive is low. The anticorrosives according to Comparative Examples 2 and 3 have bad adhesions since the anticorrosives do not contain a C8-C13 alkyl acrylate. The anticorrosive according to Comparative Example 4 has an insufficient adhesion to the clean surface since the content of the C8-C13 acrylate in the anticorrosive is too high. The anticorrosives according to Comparative Examples 5 and 6 have bad heat aging resistances, though having good adhesions, since the anticorrosives contain too much C8-C13 alkyl acrylate in addition to a large amount of isobornyl acrylate. Comparative Examples 7 is different from Comparative Example 4 in the length of the alkyl group of the alkyl acrylate. The anticorrosive according to Comparative Example 7 has a bad adhesion to the clean surface since the content of the alkyl acrylate in the anticorrosive is too high. The anticorrosive according to Comparative Example 8 has bad heat aging resistance since the anticorrosive contains the alkyl acrylate having the alkyl group of C18. The anticorrosives according to Examples 1 to 7 and Comparative Examples 1 to 8 all have good cold/heat shock resistances.

Examples 8 to 20

Curable resin compositions as anticorrosives according to Examples 8 to 20 were prepared by uniform mixing of ingredients such as (meth)acrylate polymers, monomers, a photoinitiator, and a thermal initiator according to the content ratios shown in Table 3. The compositions according to Examples 8 to 20 contain the C2-C4 alkyl acrylate ingredients (D) as monomer ingredients, in addition to the ingredients contained in the compositions according to Examples 1 to 7. Tests were performed for the prepared compositions in the same way as in Examples 1 to 7. The results of the tests are shown in Table 3.

Comparative Examples 9 to 16

Compositions according to Comparative Examples 9 to 16 were prepared. The compositions contain different amounts of the ingredients (D) from the compositions according to Examples 8 to 20. Tests were performed for the prepared compositions in the same way as in Examples. The results of the tests are shown in Table 4.

[Test Results of Examples 8 to 20 and Comparative Examples 9 to 16]

As shown in Table 3, the anticorrosives according to Examples 8 to 20 have excellent shear adhesion strengths, hardnesses, and heat aging resistances. While the anticorrosives according to Examples 1 to 7 have good cold/heat shock resistances, the anticorrosives according to Examples 8 to 20 have excellent cold/heat shock resistances since the anticorrosives according to Examples 8 to 20 contain the C2-C4 alkyl (meth)acrylates (D). Though the anticorrosives according to Comparative Examples 9 to 16 contain the C2-C4 alkyl (meth)acrylates (D), as shown in FIG. 4, the contents thereof are not in the specific range. Thus, the anticorrosives according to Comparative Examples 9 to 16 have low heat aging resistances and/or insufficient cold/heat shock resistances.

TABLE 1

| | | Example | | | | | | |
|---|---|---|---|---|---|---|---|---|
| | | 1 | 2 | 3 | 4 | 5 | 6 | 7 |
| Content of Anticorrosive (part by mass) | | | | | | | | |
| Ingredient (A) (Meth)acrylate Polymer | Polymer 1 (CN 820) | 100 | 100 | 100 | 100 | — | 100 | 100 |
| | Polymer 2 (EBECRYL 767) (Polymer content) | — | — | — | — | 143 (100) | — | — |
| Ingredient (B) | Isobornyl Acrylate (Total content of IBA) | 40 | 40 | 90 | 90 | 47 (90) | 90 | 40 |
| Ingredient (C) | Lauryl Acrylate (C = 12) | 1 | 15 | 1 | 15 | 1 | 15 | — |
| | Tridecyl Acrylate (C = 13) | — | — | — | — | — | — | 15 |
| Ingredient (D) | Butyl Acrylate | — | — | — | — | — | — | — |
| | Ethyl Acrylate | — | — | — | — | — | — | — |
| | Methoxyethyl Acrylate | — | — | — | — | — | — | — |
| Photoinitiator | Irgacure 184 | 4 | 4 | 4 | 4 | 4 | — | 4 |
| Thermal Initiator | Perbutyl O | — | — | — | — | — | 1 | — |
| Total | | 145 | 159 | 195 | 209 | 195 | 206 | 159 |
| Test Result | | | | | | | | |
| Adhesion | On Clean Surface | G | G | G | G | G | G | G |
| | On Oily Surface | G | E | G | E | G | E | E |
| Hardness | Type A Hardness: 50 or Higher | G | G | G | G | G | G | G |
| Heat aging Resistance | Elongation after Heating: 10% or Higher | G | G | G | G | G | G | G |
| Cold/Heat Shock Resistance | 250 Cycles or More | G | G | G | G | G | G | G |

"E"=Excellent, "G"=Good

TABLE 2

| | | Comparative Example | | | | | | | |
|---|---|---|---|---|---|---|---|---|---|
| | | 1 | 2 | 3 | 4 | 5 | 6 | 7 | 8 |
| Content of Anticorrosive (part by mass) | | | | | | | | | |
| Ingredient (A) (Meth)acrylate Polymer | Polymer 1 (CN 820) | 100 | 100 | 100 | 100 | 100 | — | 100 | 100 |
| | Polymer 2 (EBECRYL 767) (Polymer content) | — | — | — | — | — | 143 (100) | — | — |
| Ingredient (B) | Isobornyl Acrylate (Total content of IBA) | 30 | 40 | 90 | 40 | 90 | 47 (90) | 40 | 40 |
| Ingredient (C) | Lauryl Acrylate (C = 12) | 1 | — | — | 30 | 30 | 30 | — | — |
| | Tridecyl Acrylate (C = 13) | — | — | — | — | — | — | 30 | — |
| | Stearyl Acrylate (C = 18) | — | — | — | — | — | — | — | 15 |
| Ingredient (D) | Butyl Acrylate | 10 | 20 | 40 | 10 | 40 | 10 | — | — |
| | Ethyl Acrylate | — | 20 | — | — | — | — | 10 | — |
| | Methoxyethyl Acrylate | — | — | — | — | — | — | — | — |
| Photoinitiator | Irgacure 184 | 4 | 4 | 4 | 4 | 4 | 4 | 4 | 4 |
| Total | | 145 | 184 | 234 | 184 | 264 | 234 | 184 | 159 |
| Test Result | | | | | | | | | |
| Adhesion | On Clean Surface | G | B | B | B | G | G | B | G |
| | On Oily Surface | G | B | B | G | G | G | G | G |
| Hardness | Type A Hardness: 50 or Higher | B | G | G | G | G | G | G | G |
| Heat aging Resistance | Elongation after Heating: 10% or Higher | G | G | G | G | B | B | G | B |
| Cold/Heat Shock Resistance | 250 Cycles or More | G | G | G | G | G | G | G | G |

"G"=Good, "B"=Bad

TABLE 3

| | | Example | | | | | | | | | | | | |
|---|---|---|---|---|---|---|---|---|---|---|---|---|---|
| | | 8 | 9 | 10 | 11 | 12 | 13 | 14 | 15 | 16 | 17 | 18 | 19 | 20 |
| Content of Anticorrosive (part by mass) | | | | | | | | | | | | | | |
| Ingredient (A) (Meth)acrylate Polymer | Polymer 1 (CN 820) | 100 | 100 | 100 | 100 | 100 | 100 | 100 | 100 | 100 | 100 | 100 | — | 100 |
| | Polymer 2 (EBECRYL 767) (Polymer content) | — | — | — | — | — | — | — | — | — | — | — | 143 (100) | — |
| Ingredient (B) | Isobornyl Acrylate (Total content of IBA) | 40 | 40 | 40 | 40 | 40 | 90 | 90 | 90 | 90 | 90 | 90 | 47 (90) | 90 |
| Ingredient (C) | Lauryl Acrylate (C = 12) | 1 | 1 | 1 | 15 | 15 | 1 | 1 | 15 | 15 | 15 | 15 | 15 | — |
| | Tridecyl Acrylate (C = 13) | — | — | — | — | — | — | — | — | — | — | — | — | 15 |
| Ingredient (D) | Butyl Acrylate | 10 | 20 | 40 | 10 | 40 | 10 | — | 10 | 40 | 20 | 40 | 10 | — |
| | Ethyl Acrylate | — | 20 | — | — | — | — | 10 | — | — | — | — | — | — |
| | Methoxyethyl Acrylate | — | — | — | — | — | — | — | — | — | — | 20 | — | — |
| Photoinitiator | Irgacure 184 | 4 | 4 | 4 | 4 | 4 | 4 | 4 | 4 | 4 | 4 | — | 4 | 4 |
| Thermal Initiator | Perbutyl O | — | — | — | — | — | — | — | — | — | — | 1 | — | — |
| Total | | 155 | 185 | 185 | 169 | 199 | 205 | 205 | 219 | 249 | 249 | 246 | 219 | 209 |
| Test Result | | | | | | | | | | | | | | |
| Adhesion | On Clean Surface | G | G | G | G | G | G | G | G | G | G | G | G | G |
| | On Oily Surface | G | G | G | E | E | G | G | E | E | E | E | E | E |
| Hardness | Type A Hardness: 50 or Higher | G | G | G | G | G | G | G | G | G | G | G | G | G |
| Heat aging Resistance | Elongation after Heating: 10% or Higher | G | G | G | G | G | G | G | G | G | G | G | G | G |
| Cold/Heat Shock Resistance | 250 Cycles or More | E | E | E | E | E | E | E | E | E | E | E | E | G |

"E"=Excellent, "G"=Good

TABLE 4

| | | Comparative Example | | | | | | | |
|---|---|---|---|---|---|---|---|---|---|
| | | 9 | 10 | 11 | 12 | 13 | 14 | 15 | 16 |
| Content of Anticorrosive (part by mass) | | | | | | | | | |
| Ingredient (A) (Meth)acrylate Polymer | Polymer 1 (CN 820) | 100 | 100 | 100 | 100 | 100 | 100 | — | 100 |
| | Polymer 2 (EBECRYL 767) (Polymer content) | — | — | — | — | — | — | 143 (100) | — |
| Ingredient (B) | Isobornyl Acrylate (Total content of IBA) | 40 | 40 | 40 | 90 | 90 | 90 | 47 (90) | 90 |
| Ingredient (C) | Lauryl Acrylate (C = 12) | 1 | 1 | 15 | 15 | 15 | 15 | 15 | — |
| | Tridecyl Acrylate (C = 13) | — | — | — | — | — | — | — | 15 |
| | Stearyl Acrylate (C = 18) | — | — | — | — | — | — | — | — |
| Ingredient (D) | Butyl Acrylate | 80 | 40 | 80 | 80 | 40 | 80 | 80 | 80 |
| | Ethyl Acrylate | — | 40 | — | — | — | — | — | — |
| | Methoxyethyl Acrylate | — | — | — | — | 40 | — | — | — |
| Photoinitiator | Irgacure 184 | 4 | 4 | 4 | 4 | 4 | 4 | 4 | 4 |
| Total | | 225 | 225 | 239 | 289 | 289 | 289 | 289 | 289 |
| Test Result | | | | | | | | | |
| Adhesion | On Clean Surface | G | G | G | G | G | G | G | G |
| | On Oily Surface | G | G | E | E | E | E | E | E |
| Hardness | Type A Hardness: 50 or Higher | G | G | G | G | G | G | G | G |
| Heat aging Resistance | Elongation after Heating: 10% or Higher | B | B | B | B | B | B | B | B |
| Cold/Heat Shock Resistance | 250 Cycles or More | G | G | G | B | B | B | B | B |

"E"=Excellent, "G"=Good, "B"=Bad

The foregoing description of the preferred embodiment of the present invention has been presented for purposes of illustration and description; however, it is not intended to be exhaustive or to limit the present invention to the precise form disclosed, and modifications and variations are possible as long as they do not deviate from the principles of the present invention.

The terminal-attached covered electric wire 1 described above has the tab-shaped male terminal; however, the type of the connection terminal is not limited to the specific type. For example, the connection terminal may be a female terminal or a fork terminal.

The barrel portion 54 of the connection terminal 5 may consist only of the wire barrel without having an insulation barrel.

Alternatively, the barrel portion 54 consists only of the insulation barrel. In this case, the wire conductor may be connected to the connection terminal by pressure welding, resistance welding, ultrasonic welding, or soldering.

The strand is used as the wire conductor 3 in the embodiment described above. However, a single core wire may be used as the wire conductor 3, instead.

The invention claimed is:

1. An anticorrosive comprising a curable resin composition that comprises, as main ingredients:
   (A) 100 parts by mass of a polymer, derived only from one or more (meth)acrylate monomer(s) selected from the group consisting of methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, trifluoromethylmethyl (meth)acrylate, 2-perfluoroethyl(meth)acrylate, 2-perfluoromethyl (meth)acrylate, 2-(perfluorohexyl)ethyl (meth)acrylate, and 2-(perfluorodecyl)ethyl (meth)acrylate, the polymer, following formation from the one or more (meth)acrylate monomer(s), having two or more (meth)acrylate functional groups in the polymer chain;
   (B) 40 to 90 parts by mass of isobornyl (meth)acrylate; and
   (C) 1 to 15 part by mass of an alkyl (meth)acrylate represented by formula 1

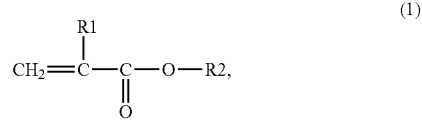

where R1 is either H or CH3, and R2 is an alkyl group having a carbon number of 8 to 13, and wherein the alkyl (meth)acrylate is not isobornyl (meth)acrylate.

2. The anticorrosive according to claim 1, wherein the composition further comprises (D) 10 to 40 parts by mass of an alkyl (meth)acrylate represented by the formula $$CH_2 = \underset{\underset{R3}{|}}{C} - \underset{\underset{O}{\parallel}}{C} - O - R4$$

where R3 is either H or CH3, and R4 is an alkyl group having a carbon number of 2 to 4 or an alkylether group having a carbon number of 2 to 4, with respect to 100 parts by mass of the ingredient (A).

3. The anticorrosive according to claim 2, wherein the composition is an ultraviolet curable resin composition.

4. The anticorrosive according to claim 2, wherein the composition comprises a photoinitiator having an absorption in a wavelength range of 320 to 420 nm.

5. The anticorrosive according to claim 2, wherein the composition is a thermally curable resin composition.

6. The anticorrosive according to claim 1, wherein the composition is an ultraviolet curable resin composition.

7. The anticorrosive according to claim 1, wherein the composition comprises a photoinitiator having an absorption in a wavelength range of 320 to 420 nm.

8. The anticorrosive according to claim 1, wherein the composition is a thermally curable resin composition.

9. A terminal-attached covered electric wire comprising a wire conductor and a connection terminal, wherein the terminal-attached covered electric wire comprises a contact portion where the wire conductor and the connection terminal are in contact with each other, the contact portion covered with the anticorrosive according to claim 1.

10. The terminal-attached covered electric wire according to claim 9, wherein the wire conductor is made of an aluminum-based metal, the connection terminal is made of a copper-based metal, and the contact portion forms a bimetallic connection.

11. A wiring harness comprising the terminal-attached covered electric wire including the anticorrosive covering the contact portion thereof according to claim 9.

* * * * *